United States Patent
Bridgelall et al.

(10) Patent No.: US 9,966,790 B2
(45) Date of Patent: May 8, 2018

(54) CONFORMAL BODY CAPACITORS SUITABLE FOR VEHICLES

(71) Applicants: University of North Dakota, Grand Forks, ND (US); NDSU Research Foundation, Fargo, ND (US)

(72) Inventors: Raj Bridgelall, Planno, TX (US); Michael Corcoran, Grand Forks, ND (US)

(73) Assignees: University of North Dakota, Grand Forks, ND (US); NDSU Research Foundation, Fargo, ND (US)

( * ) Notice: Subject to any disclaimer, the term of this patent is extended or adjusted under 35 U.S.C. 154(b) by 1058 days.

(21) Appl. No.: 14/457,662

(22) Filed: Aug. 12, 2014

(65) Prior Publication Data
US 2015/0249362 A1  Sep. 3, 2015

Related U.S. Application Data

(60) Provisional application No. 61/868,214, filed on Aug. 21, 2013.

(51) Int. Cl.
| | |
|---|---|
| H02J 7/34 | (2006.01) |
| B60L 11/00 | (2006.01) |
| B64C 1/00 | (2006.01) |
| B60L 11/18 | (2006.01) |
| H01G 11/10 | (2013.01) |
| H01G 11/76 | (2013.01) |

(52) U.S. Cl.
CPC ............. *H02J 7/345* (2013.01); *B60L 11/005* (2013.01); *B60L 11/1816* (2013.01); *B60L 11/1861* (2013.01); *B60L 11/1868* (2013.01); *B64C 1/00* (2013.01); *H01G 11/10* (2013.01); *H01G 11/76* (2013.01); *B60L 2200/10* (2013.01); *B60L 2240/36* (2013.01); *B60L 2240/662* (2013.01); *B64D 2221/00* (2013.01); *Y02E 60/13* (2013.01); *Y02T 10/7005* (2013.01); *Y02T 10/7022* (2013.01); *Y02T 10/7044* (2013.01); *Y02T 10/7066* (2013.01); *Y02T 10/7072* (2013.01); *Y02T 10/7291* (2013.01); *Y02T 90/14* (2013.01); *Y02T 90/16* (2013.01)

(58) Field of Classification Search
CPC ... A61N 1/10; A61N 1/16; A61N 1/18; A61N 1/40
See application file for complete search history.

(56) References Cited

U.S. PATENT DOCUMENTS

| | | | |
|---|---|---|---|
| 4,697,761 A | 10/1987 | Long | |
| 5,811,958 A * | 9/1998 | Yamamoto | H02J 7/35 320/101 |
| 5,850,113 A | 12/1998 | Weimer et al. | |
| 6,919,648 B2 | 7/2005 | Bolz et al. | |

(Continued)

OTHER PUBLICATIONS

"Supercapacitor" from https://en.wikipedia.org/wiki/Supercapacitor, visited Aug. 1, 2014, 51 pages.

*Primary Examiner* — Thienvu Tran
*Assistant Examiner* — David M Stables
(74) *Attorney, Agent, or Firm* — Kinney & Lange, P.A.

(57) ABSTRACT

A vehicle system includes a plurality of capacitors each forming a portion of a vehicle structure, and a parallel electrical link between a pair of the plurality of capacitors, such that the pair of capacitors act as an aggregate capacitor.

18 Claims, 6 Drawing Sheets

(56) References Cited

U.S. PATENT DOCUMENTS

| | | |
|---|---|---|
| 7,855,017 B1 | 12/2010 | Snyder et al. |
| 7,864,505 B1 | 1/2011 | O'Brien et al. |
| 7,928,700 B2 | 4/2011 | Cour |
| 8,057,938 B1 | 11/2011 | South et al. |
| 8,576,542 B2 | 11/2013 | Snyder et al. |
| 8,738,268 B2 | 5/2014 | Karimi et al. |
| 2009/0008507 A1 | 1/2009 | Pearson |
| 2011/0051320 A1* | 3/2011 | Miller ............ H01G 9/02 361/524 |
| 2011/0075323 A1 | 3/2011 | Kawakami et al. |
| 2012/0037438 A1 | 2/2012 | Schultz et al. |
| 2012/0056040 A1 | 3/2012 | Brotherton-Ratcliffe et al. |
| 2013/0320755 A1 | 12/2013 | Peuser et al. |
| 2014/0014403 A1* | 1/2014 | Miller ............ H05K 1/0281 174/260 |
| 2014/0042270 A1 | 2/2014 | Lai |
| 2014/0049879 A1 | 2/2014 | Snyder et al. |
| 2014/0070736 A1 | 3/2014 | Gorka |

\* cited by examiner

CONFORMAL BODY CAPACITORS SUITABLE FOR VEHICLES

CROSS-REFERENCE TO RELATED APPLICATION(S)

This application claims priority to U.S. Provisional Application No. 61/868,214, filed on Aug. 21, 2013, and entitled CONFORMAL BODY CAPACITORS SUITABLE FOR VEHICLES, the disclosure of which is incorporated by reference.

STATEMENT OF GOVERNMENT INTEREST

The U.S. Government has a paid-up license in this invention and the right in limited circumstances to require the patent owner to license others on reasonable terms as provided for by the terms of Contract No. DTOS59-06-G-046 awarded by U.S. Department of Transportation.

BACKGROUND

The present invention relates generally to capacitors, and more specifically to capacitors capable of use as part of a fuselage or body, such as for an air-, land- or marine-based vehicle.

The fuselage of an Unmanned Aircraft Systems (UAS), interchangeably referred to as an Unmanned Aircraft Vehicle (UAV) or Remotely Piloted Vehicle (RPV), primarily serves as the structural and lift-producing airframe component that enables controlled flight of the UAS within specified operational envelopes and flight conditions appropriate for the category of UAS. UAS airframes can provide the necessary enclosure(s) for remote sensing payloads and otherwise critical UAS avionics systems that enable capabilities such as precision navigation, radio communication, environmental systems and UAS sensor functionality (transmitted via RF communications to various ground control stations). Typically, the ground control stations and controlling pilot are located either within Line of Site (LOS) or Beyond Line of Site (BLOS) of the air vehicle, often at great distances from each other. The various fuselage compartments of the UAS may house equipment such as power sources, engines or electric power plants, electronics and antennas that communicate with ground control systems or other airborne aeronautical assets. Generally, the range of a given UAS is a function of its aerodynamic design, mass, and the energy efficiency of its propellant system; sometimes constrained by the maximum effective distance of the UAS command links, communications links and onboard fuel/power limitations. Often, lack of redundancy of onboard UAS systems restricts expanded use of UAS within the U.S. National Air Space (NAS), governed by the Federal Aviation Administration (FAA)—available redundant, on-board electrical power sources are necessary to power avionics systems that provide precision navigation and air vehicle flight control. The mass of the aircraft is a direct function of the body volume, construction material properties, mass of the engine sub-system, and mass of other payload items such as on-board sensors—all of which directly affect the flight performance characteristics of UAS, regardless of size.

Battery-powered aircraft generally utilize high charge capacity batteries that are significant contributors to the weight and bulk of the engine subsystem. It is desired to provide an alternative to reliance solely on batteries for aircraft power. A solution to such a problem associated with aircraft (whether manned, unmanned, or man-in-the-loop) will have applicability in other settings as well, such as for land- or marine-based vehicles and other powered devices.

SUMMARY

In one aspect, a vehicle system includes a plurality of capacitors each forming a portion of a vehicle structure, and a parallel electrical link between a pair of the plurality of capacitors, such that the pair of capacitors act as an aggregate capacitor. Other aspects of the present invention will be recognized in view of the entirety of the present disclosure.

Figure 1:
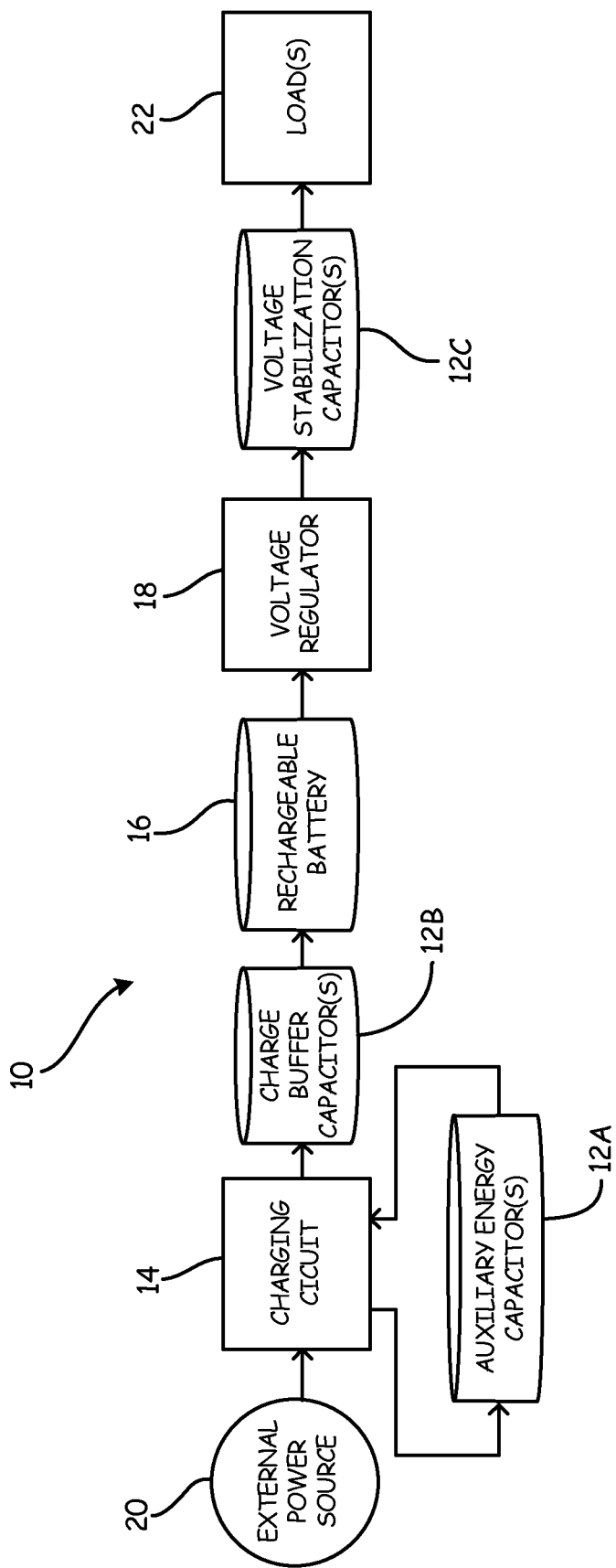
FIG. 1 is a functional block diagram of an embodiment of a vehicle system according to the present invention.

While the above-identified drawing figures set forth one or more embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale.

DETAILED DESCRIPTION

In general, the present invention provides an apparatus and method to help enhance a charge storage capacity of a system such as an Unmanned Aircraft System (UAS) or other vehicle system by utilizing a body of the vehicle as a capacitor to store electric charge, and a system for charging the capacitor and utilizing it as an auxiliary source of energy to augment the primary on-board power source. The packaging and assembly of this capacitive component is such that the resulting form is also a suitable structural member of the vehicle, such as wings or fuselage of an aircraft, and other structural components such as rods, beams and decks. In one embodiment, the system can include at least three capacitors. A first capacitor can implement a large, auxiliary on-board energy storage. A second capacitor can implement an energy buffer between a charging circuit and a battery. A third capacitor can implement a charge buffer between a primary power source and an electric load. To facilitate ease of construction and cost reduction, each capacitor can be an aggregate of parallel capacitor arrays where individual capacitors of the array are shaped as conformal bands positioned on or within the inner surface of a vehicle's body or fuselage (e.g., aircraft fuselage), or an otherwise appropriate segment of the body or fuselage. Utilizing the vehicle body or fuselage as capacitors helps reduce the overall power source bulk and increases the capacity for payloads.

One aspect of the present invention, with respect to aircraft applications (whether manned, unmanned, or man-in-the-loop), is to replace the conventional fuselage of the aircraft with equivalently shaped super-capacitor arrays constructed and assembled in a manner that provides both structural and electrical requirements for the aircraft. These super-capacitor arrays can be placed into the body of the aircraft, such as either the main body (i.e., fuselage) or lifting surfaces (e.g., wings), in order to maximize the power available while increasing efficiency though having close proximity to systems that may leverage the stored energy. The additional power, stored within the fuselage capacitor system, becomes available for use within multiple facets for the aircraft, such as extending the operational time of electric motors and servos, and/or providing an on-demand and redundant power source for critical avionics systems (navigation and communications) and environmental systems (anti-ice and de-ice for all-weather enhancements) to aircraft of all sizes. It should be appreciated that as a structural component, the same or similar fuselage capacitor design suitable for an aircraft application (whether manned, unmanned, or man-in-the-loop) can be utilized for ground-based vehicles, surface-based marine vehicles (water-surface) and sub-surface marine vehicles with substantially equal benefit, adjusting for inherent differences in the structural requirements unique to different modes of transportation.

Super-capacitors provide significant advantages over large batteries. They are capable of delivering higher peak currents to facilitate large dynamic electric load swings, are essentially maintenance free, and operate across a wider range of temperature and charging life cycles. Super-capacitors are also more environmentally friendly. However, unlike batteries, super-capacitors provide a less stable voltage output over time as the stored charge depletes. Hence, in one embodiment, combining one or more super-capacitors with a battery provides both a large charge capacity and a stable voltage output under high dynamic loading conditions.

Moreover, for a given vehicle operational range, it is possible to reduce battery bulk and weight by incorporating super-capacitors for both energy storage and voltage stabilization. Super-capacitors generally have lower volumetric and gravimetric energy density than batteries, and require a substantial amount of surface area between their parallel plates to store equivalent amounts of charge. However, incorporating capacitor structures into a vehicle body (e.g., fuselage) can allow sufficient surface area to store substantial amounts of charge.

Numerous additional features and benefits of the present invention will be appreciated in view of the description that follows and in view of the accompanying figures.

A practical super-capacitor generally includes two parallel plates (acting as positive and negative electrodes) with a dielectric material sandwiched between the parallel plates. A capacitance value C of the capacitor is given by Equation (1):

$$C = \varepsilon_0 \frac{A}{d} \quad (1)$$

where $\varepsilon_0$ is the permittivity, A is the surface areas of the plate electrodes, and d is their separation distance. A typical technique for increasing the surface area is to coat the insides of each plate with carbon particles. As used with the present invention, electrode plate materials can be generally flexible and can be constructed of suitable metallic foil material.

FIG. 1 is a functional block diagram of an embodiment of a vehicle system 10 that includes three capacitors 12A-12C, a charging circuit 14, one or more rechargeable batteries 16, and a voltage regulator 18. Also illustrated are an external power source 20 and load(s) 22. The capacitors 12A-12C can each be super-capacitors and can function as auxiliary energy storage (capacitor(s) 12A), a charge buffer (capacitor(s) 12B), and a voltage stabilization element (capacitor(s) 12C). It should be appreciated that the embodiment of the vehicle system 10 shown in FIG. 1 is provided merely by way of example and not limitation. For instance, numerous additional components not specifically shown can be incorporated as desired for particular embodiments. Moreover, certain components could be omitted if not desired for particular applications.

In the illustrated embodiment of FIG. 1, the auxiliary energy capacitor(s) 12A and the external power source 20 are both electrically connected to the charging circuit 14, in parallel. The charge buffer capacitor(s) 12B can be electrically connected between the charging circuit 14 and the rechargeable battery 16, in series. The voltage regulator 18 and the voltage stabilization capacitor(s) 12C can in turn bet electrically connected between the rechargeable battery 16 and the load(s) 22, in series. All of the components of the vehicle system 10 can be vehicle-borne, that is, located on board or carried by the vehicle. The particular configuration of the system 10 can vary as desired for particular applications, such as with different electrical connections between various components and nearly any desired physical arrangement of the components.

During operation of the vehicle system 10, when the external power source 20 is available (e.g., an engine or vehicle power plant, etc.), the charging circuit 14 adapts to an optimum (i.e., relatively high performance) mode that charges the on-board rechargeable battery 16 (via the charge buffer capacitor 12B) and the auxiliary energy storage capacitor 12A. In the absence or unavailability of the external power source 20 during operation of the vehicle system 10, the charging circuit 14 can operate to transfer charge from the auxiliary energy storage capacitor 12A to the rechargeable battery 16 via the charge buffer capacitor 12B. The charge buffer capacitor 12B facilitates differences in a charge utilization rate from the battery 16 and a charging rate of the battery 16. The voltage stabilization capacitor 12C provides a charge reservoir to support dynamic current demands from one or more loads 22 (e.g., a motor, communications circuitry, etc.) without taxing the ability of the battery 16 to generate such variations in current. Dynamic current loads occur because of changing demands from both a motor and, for instance, wireless communications systems. The charge buffering functionality results in greater reliability and longevity of the battery 16. The three capacitors 12A-12C can each be implemented as aircraft body (e.g., fuselage) integrated capacitors, as discussed further below.

Figure 2:
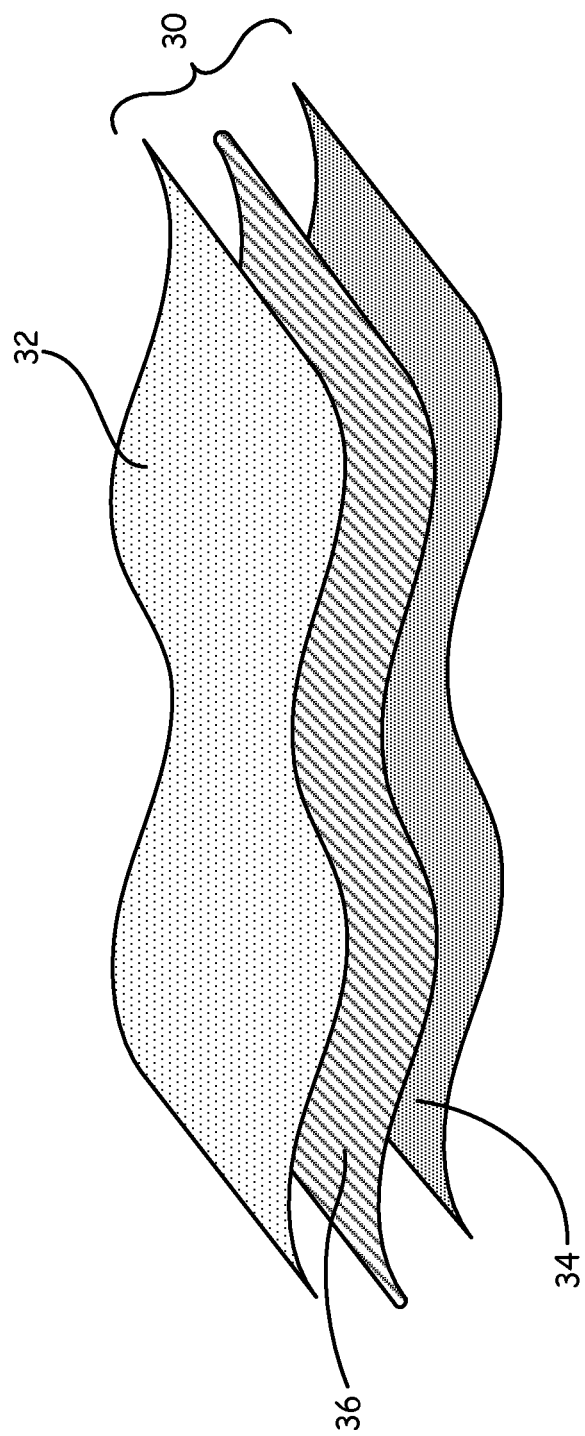
FIG. 2 is an exploded view of a portion of a capacitor band.

FIG. 2 is an exploded view of a portion of a capacitor band 30, which illustrates one example of the concept of layering flexible material as that capacitor band 30 that can be shaped or contoured to conform to a non-planar shape of different parts of a vehicle body (e.g., aircraft fuselage). As shown in the embodiment of FIG. 2, the capacitor band 30 includes a positive electrode layer plate 32, a negative electrode layer plate 34, and at least one dielectric material layer plate 36. The dielectric material layer plate 34 is positioned in between the positive electrode layer plate 32 and the negative electrode layer plate 34. There can be multiple dielectric material layer plates 34 between the electrode layers 32 and 34, as well as other types of intermediate layers not specifically shown, in further embodiments. The particular arrangement of the positive and negative electrode layer plates 32 and 34 can vary as desired for particular applications, with either electrode 32 or 34 in an outer or inner, top or bottom, left or right position, for example. The band 30 can be of a large size (i.e., have a large surface area), to help maximize charge carrying capacity.

Manufacturers can construct capacitor plates 32-36 using flexible composite materials or alloys that are consistent with existing technology and manufacturing methods. In one embodiment, materials such as Carbon Fiber Reinforced Plastic or other suitable composite materials can be used that also provides a suitable substrate to sandwich carbon sheets or coatings to extend the charge storage surface of the given capacitor band 30. For example, it is now common to use carbon nano-fibers grown on metallic surfaces to produce a large per-area porous substrate to enhance charge storage capabilities. The dielectric material layer plate 36 for a given capacitor 12A-12C can be one or more coatings on metallic plates or can be implemented as separate sheets of materials and separators such as Graphene sheets or carbon nanotubes with suitable dielectric properties.

Existing manufacturing tools are available to shape and cut the flexible plates 32-36 into appropriately dimensioned bands that will fit as layers within other, optional construction materials (not shown) that can help protect the capacitor 12A, 12B or 12C and provide a suitable exterior and suitable strength for use with fuselage, wings, and other major components of an aircraft or other vehicular body. Adopting existing techniques to create several super-capacitors in parallel with graduated dimensions that conform to the fuselage and wing shapes will implement a larger composite capacitor 12A-12C that can provide one of the three main capacitor functionalities of the vehicle system 10 described above.

The shaped plates 32-36 can be fashioned into the capacitor band 30, with each capacitor 30 having suitable dimensions to fit within or define assembled sections of the aircraft body, as discussed further below. Different capacitor bands 30 can have different dimensions and shapes (see FIGS. 4A-4C). It should be noted that the term "band" as used herein incorporates nearly any suitable shape, such as full bands (i.e., full rings) or partial bands (i.e., band segments or arcs).

Figure 3:
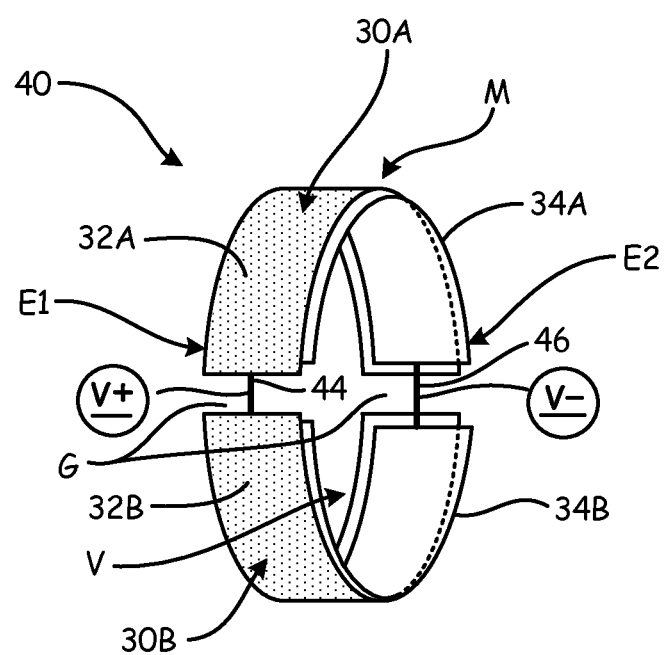
FIG. 3 is a perspective view of an embodiment of an aggregate capacitor assembly.

FIG. 3 is a perspective view of an embodiment of an aggregate capacitor assembly band 40, which includes a first capacitor subassembly 30A and a second capacitor subassembly 30B separated by a pair of perimeter gaps G. The first capacitor subassembly 30A includes a positive electrode 32A and a negative electrode 34A, and the second capacitor subassembly 30B includes a positive electrode 32B and a negative electrode 34B. For simplicity, a dielectric layer is not specifically shown in FIG. 3. The first and second capacitor subassemblies 30A and 30B are each configured as arc segments that collectively define a full ring shape (i.e., traversing approximately 360° about a center point) having an interior volume V (e.g., a void space). In the illustrated embodiment, the first and second capacitor subassemblies 30A and 30B are each configured as portions of a cylinder that are semi-circular arcs in profile, each traversing approximately 180° about a center point, with opposite ends E1 and E2 that are both bent in the same direction away from a middle portion M. arc-shaped or otherwise bent or curved shape of the first and second capacitor subassemblies 30A and 30B can help facilitate desired structural properties, such as desired stiffness and/or flexibility. The example embodiment illustrated in FIG. 3 is provided merely by way of example and not limitation. In further embodiments, other configurations are possible, such as conical, frusto-conical, rectangular, triangular, etc.

All of the capacitors subassemblies 30A and 30B in a given aggregate capacitor band assembly 40 can form a parallel connection to provide additive charge storage capacity. For example, when two capacitor bands or subassemblies 30A and 30B come together, as shown in the illustrated embodiment of FIG. 3, the positive electrodes 32A and 32B are electrically connected (e.g., across a generally circumferential perimeter gap G) in parallel with a conductive link 44. The conductive link 44 can in turn be electrically connected to a contact V+, for connection to other circuitry. Similarly, the negative electrodes 34A and 34B are electrically connected (e.g., across a generally circumferential perimeter gap G) in parallel with a conductive link 46. The conductive link 46 can in turn be electrically connected to a contact V−, for connection to other circuitry. The size of the gaps G bridged by the conductive links 44 and 46 can vary as desired for particular applications. Moreover, the conductive links 44 and 46 can be discrete electrical connections, such as one or more wires, rather than having the same shape as corresponding layers of the capacitor subassemblies 30A and 30B. In further embodiments, nearly any number of capacitor subassemblies (separated by corresponding gaps) can be used to make an aggregate capacitor assembly band. Moreover, conductive links can additionally or in the alternative be formed generally longitudinally or axially between different capacitor bands or subassemblies, as desired for particular applications.

The aggregate capacitor band 40 can be shaped and assembled in such a manner that the resulting shape and structure can provide desired lift/drag design requirements for an aircraft body component (e.g., fuselage). That is, the "packaging" and assembly of the capacitive materials of the aggregate capacitor band 40 result in the strength and forms needed to provide the required aircraft structural integrity and lift/drag ratio. In essence, the capacitor "packaging" can be changed from a conventional design that result in suitable form factors (e.g., thin and flexible square shaped pads) for integration into traditional electronic devices (e.g., smart phones) to one of providing suitable form factors for aircraft body components (e.g., bands and contoured surfaces).

Figure 4A:
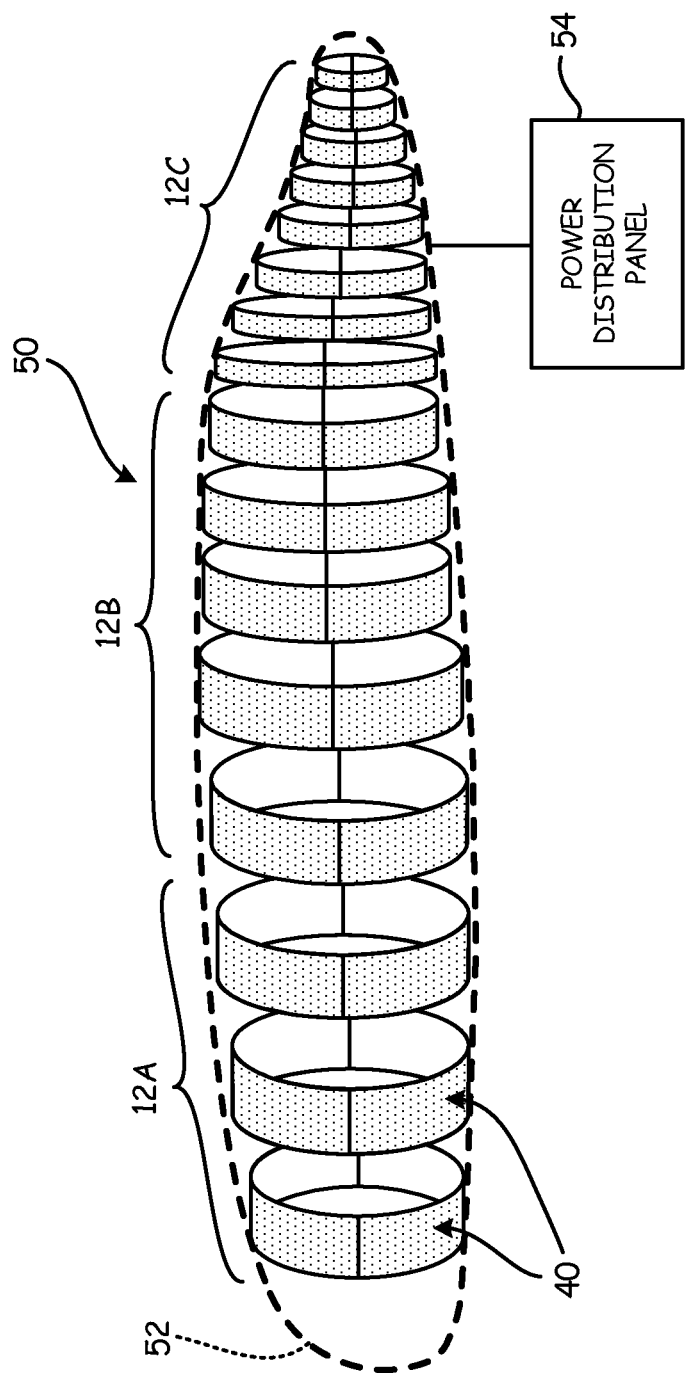
FIG. 4A is a perspective view of an embodiment of an aircraft body assembly in the form of a fuselage.

FIG. 4A is a perspective view of an embodiment of an aircraft body assembly 50 in the form of a fuselage that incorporates a plurality of the aggregate capacitor bands 40. The aggregate capacitor bands 40 are arranged adjacent one another with longitudinal gaps between them. Perimeters (e.g., outer diameters) of some or all of the aggregate capacitor 40 can be arranged at a fuselage perimeter 52, which represents an external boundary of a body of the vehicle. In such a configuration, a diametric size of each aggregate capacitor 40 can have a relative maximum value relative to the structure of the aircraft, thereby, along with the general ring shapes of the aggregate capacitor bands 40, enhancing storage capacity of the aggregate capacitor bands 40. The particular size and arrangement of the aggregate capacitor bands 40 relative to the fuselage perimeter 52 can vary as desired for particular applications. For instance, longitudinal gaps between the aggregate capacitor bands 40 and/or perimeter/circumferential gaps G between capacitor subassemblies 30A and 30B of a given aggregate capacitor band 40 can be used to create space for structures and components that penetrate, connect to, or otherwise contact the fuselage perimeter 52, to help avoid short circuits or other losses. Moreover, the internal volume defined by each aggregate capacitor band 40 can provide at least partially enclosed space for vehicle components, storage, etc. Indeed, further charge storage components (e.g., batteries) could be positioned within the internal volume defined by each aggregate capacitor band 40. Suitable electrical insulation can be provided along an interior surface of each aggregate capacitor band 40, at or near a boundary of the internal volume, in order to help prevent short circuits or other losses.

Figure 4B:
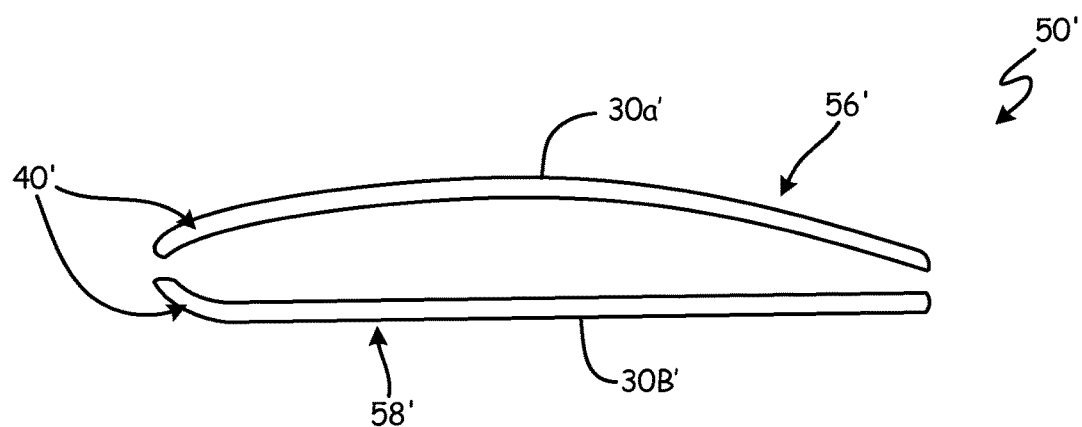
FIG. 4B is a cross-sectional view of another embodiment of an aircraft body assembly in the form of a wing.

FIG. 4B is a simplified cross-sectional view of another embodiment of an aircraft body assembly 50' in the form of a wing (interior layers of the illustrated structures are not shown in the illustrated cross-section, for simplicity). As illustrated, the assembly 50' includes an aggregate capacitor band 40' with capacitor subassemblies 30A' and 30B'. The capacitor subassembly 30A' can be arranged to form all or part of an upper or suction surface 56' of a cambered wing shape, and the capacitor subassembly 30B' can be arranged to form all or part of a lower or pressure surface 58' of the cambered wing shape.

Figure 4C:
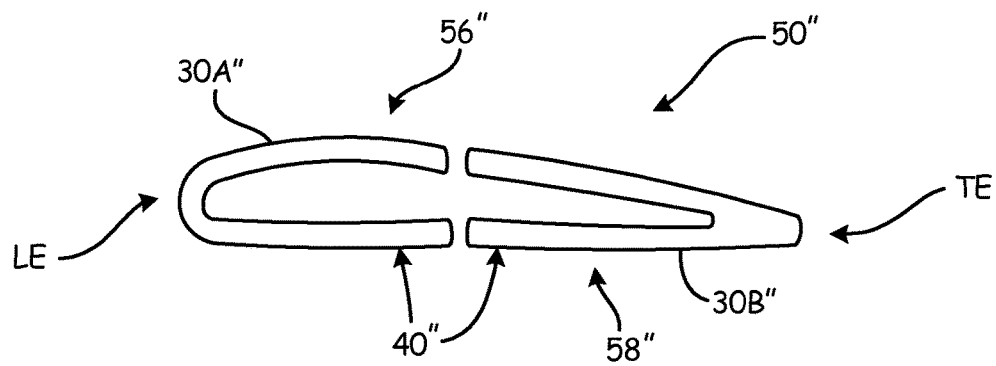
FIG. 4C is a cross-sectional view of yet another embodiment of an aircraft body assembly in the form of a wing.

FIG. 4C is a cross-sectional view of yet another embodiment of an aircraft body assembly 50" in the form of a wing (interior layers of the illustrated structures are not shown in the illustrated cross-section, for simplicity). As illustrated, the assembly 50" includes an aggregate capacitor band 40" with capacitor subassemblies 30A" and 30B". The capacitor subassembly 30A" can be arranged to form all or part of leading edge portion LE of a cambered wing shape, including portions of both an upper or suction surface 56" and a lower or pressure surface 58". The capacitor subassembly 30B" can be arranged to form all or part of a trailing edge portion TE of the cambered wing shape, including portions of both the upper or suction surface 56" and the lower or pressure surface 58".

In order to provide an aggregate capacitor, as shown in FIGS. 4A-4C, or in other aggregate configurations, nearly any number of capacitive bands 40 and/or band segments/subassemblies can be electrically connected together. For example, one or more capacitive bands 40 and/or band subassemblies 30A and 30B can be utilized individually or in aggregate to provide auxiliary energy storage, charge buffering, or voltage stabilization functionality, such as illustrated by the capacitors 12A, 12B and 12C shown in FIG. 1. For instance, any number of the bands 40, 40' and/or 40" (whether immediately adjacent one another or not) of the aircraft body assembly 50 can be aggregated to function as a single capacitor 12A, 12B or 12C. One example aggregate grouping into capacitors 12A, 12B and 12C is illustrated in FIG. 4A. When used in aggregate, particular groups of capacitor bands 40, 40' and/or 40" can be fixed for particular functions. For instance, a given application could essentially "hard wire" a particular function for a particular aggregate group of capacitor bands 40, 40' and/or 40". Alternatively, or in addition, a power distribution panel 54 can be used to flexibly (i.e., dynamically) select one or more capacitor bands 40, 40' and/or 40" for service to a particular function (e.g., for use as or with capacitor 12A, 12B or 12C) at different times during service life (e.g., during flight), as a function of flight mode, electrical demand levels, operator commends, or other operational conditions, in some embodiments.

Additionally, each aggregate capacitive band 40 of the aircraft body assembly 50 can have any suitable configuration, allowing the aggregate bands 40 to have the same or different constructions (e.g., using the same or different materials, etc.). Furthermore, the aggregate capacitor bands 40, 40' and/or 40" need not be full rings. Indeed, in some embodiments, capacitor bands 30 can take the place of some or all of the full-ring aggregate bands 40, 40' and/or 40" in forming a capacitor 12A, 12B and/or 12C.

It should be noted that the particular configuration of the aircraft body (fuselage) shown in FIG. 4 is provided merely by way of example and not limitation. Any desired number of individual capacitor bands 40 each of any desired shape and size can be used in a particular application. For example, in addition or in the alternative, UAV wings (or other suitable vehicle structures) can incorporate super-capacitor materials in layers without impeding their functionality in providing lift and controllability for the aircraft. For instance, the internal volume of a given band 40 incorporated into a wing can provide space for requisite internal wing structures (e.g., actuators, fuel tanks, etc.), and the band 40 can be shaped to conform to a desired lift-producing aerodynamic contour. In that way, the bands 40 are more versatile and adaptable to use in relatively low altitude flight applications that may demand a high degree of maneuverability, as compared to a capacitor structure that has a generally flat, single-sheet configuration.

Figure 5:
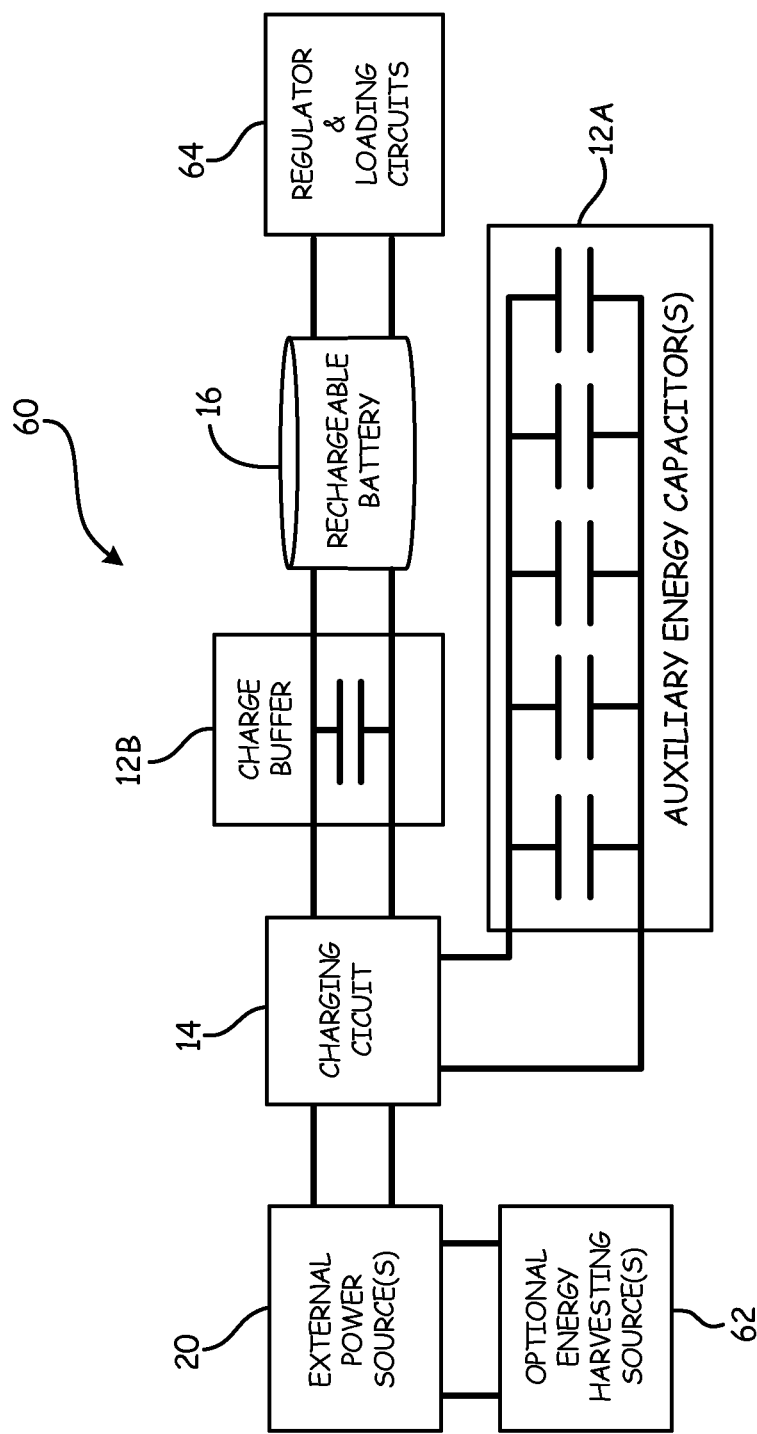
FIG. 5 is a functional block diagram of another embodiment of a vehicle system according to the present invention with one or more energy harvesting sources.

FIG. 5 is a functional block diagram of another embodiment of a vehicle system 60 with one or more energy harvesting sources 62 and regulator & loading circuits 64, together with auxiliary energy capacitor(s) 12A, a charge buffer capacitor 12B, a charging circuit 14, a rechargeable battery 16, and external power source(s) 20. The capacitors 12A and 12B can utilize body integrated super-capacitors. All of the components of the system 60 can be vehicle-borne.

The charging circuit 14 can accept AC and/or DC inputs from the external power source(s) 20 to condition them for optimum load delivery to charge the on-board battery 16 and/or the auxiliary energy capacitor 12A, which can be in the form of a vehicle body integrated capacitor. The external power source(s) 20 can be in any form that is transformable to an electric charge. The one or more energy harvesting sources 62 can be electrically connected to the charging circuit 14, and can be used in addition to or in place of other external power source(s) 20. Examples of relevant energy harvesting sources 62 are inertial, thermo-electric, and solar. Inertial sources transform flight "bumpiness" to electrical energy using one of several forms, including electromagnetic, electrostatic, piezoelectric and the like. Thermo-electric sources utilize differences in temperature between the vehicle exterior and the vehicle interior, for example, to produce a current flow across a suitable thermoelectric transducer. Solar sources utilize photovoltaic elements to convert light into electrical current. One suitable reference on known energy harvesting technology is: Hande, A., Bridgelall, R., Bhatia, D., "Energy Harvesting for Active RF Sensors and ID Tags", Chapter 18: Priya, S., Inman, D. J., (eds.), ENERGY HARVESTING TECHNOLOGIES, 1st Edition, Springer: NY, Nov. 14, 2008, ISBN-10: 0387764631. Persons of ordinary skill in the art will recognize that nearly any suitable energy harvesting mechanism or device can be utilized, as desired for particular applications.

Persons of ordinary skill in the art will recognize that the present invention provides numerous advantages and benefits. For example, use of conformal body capacitors allows a vehicle design to start with an ideal capacitor design, from an electrical power perspective, and then package/assemble such capacitors into the shape of vehicle body members, from a mechanical perspective. Significant mass and space savings are also achievable, compared to conventional battery systems for example.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by operational conditions, incidental current fluctuations, and the like.

Any relative terms or terms of degree used herein, such as "substantially", "approximately", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations and the like.

Furthermore, while the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the spirit and scope of the present disclosure given its broadest interpretation.

The invention claimed is:

1. A vehicle system comprising:
   a plurality of capacitors arranged in a ring shape, each capacitor having a partial ring shape forming a portion of a vehicle structure; and
   a parallel electrical link between a pair of the plurality of capacitors, such that the pair of capacitors act as an aggregate capacitor; and
   a pair of generally circumferential gaps between the pair of capacitors, wherein the parallel electrical link connecting the pair of capacitors electrically connects anodes of the respective capacitors across one of the generally circumferential gaps and further connects cathodes of the respective capacitors across the other of the generally circumferential gaps.

2. The system of claim 1, wherein a second pair of the plurality of capacitors are electrically linked and are arranged in a ring shape, wherein the second pair of capacitors is further electrically linked to the pair of capacitors to act as part of the aggregate capacitor.

3. The system of claim 1, wherein at least one of the plurality of capacitors is configured as a super-capacitor.

4. The system of claim 1, wherein at least one of the plurality of capacitors forms a portion of an aircraft fuselage with a geometry generally matching an exterior contour of the aircraft fuselage.

5. The system of claim 1, wherein at least one of the plurality of capacitors forms a portion of a cambered aircraft wing with a geometry generally matching an exterior contour of the aircraft fuselage.

6. The system of claim 1 and further comprising:
   a power source;
   a charging circuit;
   a battery; and
   at least one other of the plurality of capacitors is electrically connected between the charging circuit and the battery,
   wherein the pair of capacitors acting as the aggregate capacitor are configured as an auxiliary energy capacitor electrically connected to the charging circuit in parallel with the power source.

7. The system of claim 6, wherein the power source includes an energy harvesting source.

8. The system of claim 1, wherein a second pair of the plurality of capacitors are electrically linked and are arranged in a ring shape, wherein the second pair of capacitors is electrically linked to act as a second aggregate capacitor, and wherein the aggregate capacitor and the second aggregate capacitor perform different functions.

9. The system of claim 1 and further comprising:
   a power distribution panel to dynamically configure the electrical link between the pair of capacitors as a function of operational conditions.

10. The system of claim 1, wherein at least one of the capacitors is shaped to define an interior volume, and has a non-planar contour that influences at least one of lift and drag along an exterior of the vehicle.

11. The vehicle system of claim 1, wherein at least one of the plurality of capacitors comprises a first band, the first band comprising:
    an anode plate layer;
    a cathode plate layer; and
    a dielectric layer positioned between the anode plate layer and the cathode plate layer to create the capacitor,
    wherein the first band is shaped to have opposite ends extending in the same direction away from a middle portion.

12. The vehicle system of claim 11, wherein the at least one of the plurality of capacitors further comprises a second band, the second band having a non-planar contour, the second band comprising:
    an anode plate layer;
    a cathode plate layer; and
    a dielectric layer positioned between the anode plate layer and the cathode plate layer to create a capacitor, and
    the vehicle system further comprising a vehicle body perimeter, wherein portions of the vehicle body perimeter are defined by the first and second bands,
    wherein the first band and the second band are electrically connected in parallel to form an aggregate capacitor.

13. A vehicle power system comprising:
    a battery;
    a charging circuit; and
    a plurality of capacitors each having a partial ring shape, the plurality of capacitors forming portions of a vehicle body, wherein a first aggregation of the plurality of capacitors are electrically linked in parallel to act collectively as an auxiliary energy capacitor electrically connected to the charging circuit, wherein a second aggregation of the plurality of capacitors are electrically linked in parallel to act collectively as a charge buffer capacitor electrically connected between the charging circuit and the battery, and wherein a third aggregation of the plurality of capacitors are electrically linked in parallel to act collectively as a voltage stabilization capacitor electrically connected between the battery and an electrical load, wherein a first pair of the plurality of capacitors are arranged in a ring shape with a circumferential gap between the first pair of capacitors, and further wherein the parallel electrical link connecting the pair of capacitors electrically connects anodes of the respective capacitors across one of the generally circumferential gaps and further connects cathodes of the respective capacitors across the other of the generally circumferential gaps.

14. The system of claim 13 and further comprising:
an external power source electrically connected to the charging circuit in parallel with the auxiliary energy capacitor.

15. The system of claim 13, wherein a second pair of the plurality of capacitors are electrically linked and are arranged in a ring shape, wherein the second pair of capacitors is further electrically linked to the first pair of capacitors to act as part of the first aggregation of the plurality of capacitors.

16. The system of claim 13, wherein the vehicle is an aircraft and at least one of the plurality of capacitors forms a portion of a fuselage of the aircraft.

17. The system of claim 13, wherein the vehicle is an aircraft and at least one of the plurality of capacitors forms a portion of a wing of the aircraft.

18. The system of claim 13 and further comprising:
a power distribution panel to dynamically configure the electrical links between some of the plurality of capacitors to define at least one of the first, second and third aggregations of the plurality of capacitors as a function of operational conditions.

* * * * *